United States Patent [19]  
Barber

[11] Patent Number: 4,967,851  
[45] Date of Patent: Nov. 6, 1990

[54] AGRICULTURAL DEPTH CONTROL SYSTEM INCLUDING CROSS PLUMBED SERIES CYLINDERS

[75] Inventor: Dennis R. Barber, Waterloo, Iowa

[73] Assignee: Deere & Company, Moline, Ill.

[21] Appl. No.: 416,740

[22] Filed: Oct. 3, 1989

[51] Int. Cl.⁵ ............................................. A01B 63/22
[52] U.S. Cl. .................................. 172/311; 172/413; 172/459; 280/43.23
[58] Field of Search .................. 172/4, 310, 311, 316, 172/400, 401, 413, 459, 491, 619, 657, 669, 776; 280/43.13, 43.23

[56] References Cited

U.S. PATENT DOCUMENTS

| | | | |
|---|---|---|---|
| 3,486,761 | 12/1969 | Fay | 172/413 X |
| 4,286,672 | 9/1981 | Forsyth et al. | 172/311 |
| 4,324,411 | 4/1982 | MacKenzie | 172/316 X |
| 4,339,139 | 7/1982 | Swanson | 280/43.23 |
| 4,354,688 | 10/1982 | Swanson | 172/413 X |
| 4,425,971 | 1/1984 | Allen | 172/776 X |

FOREIGN PATENT DOCUMENTS 792519  8/1968  Canada ............................. 172/401

Primary Examiner—Randolph A. Reese
Assistant Examiner—Jeffrey L. Thompson

[57] ABSTRACT

A hydraulic control system is provided which includes a pair of transversely spaced rockshaft cylinders which are plumbed in parallel and connected to opposite ends of a rockshaft on the central portion or main frame of a wide implement such as a field cultivor or chisel plow. The left-hand rockshaft cylinder is connected in series with a right-hand outer cylinder located near the right end of the implement. The right-hand rockshaft cylinder is connected in series with a left-hand outer cylinder on the opposite side of the implement. When a ground condition exists which causes, for example, the left side of the implement to dig more deeply and the left-hand wing cylinder to retract, the right-hand rockshaft cylinder will also be caused to retract so the right side of the implement tends to dig in more deeply. At the same time because of the parallel connection of the rockshaft cylinders, the left-hand rockshaft cylinder will be forced to extend to reduce the depth of penetration of the left side of the implement which offsets the tendency of the left side to dig in and provides a more uniform average working depth across the width of the implement.

11 Claims, 2 Drawing Sheets

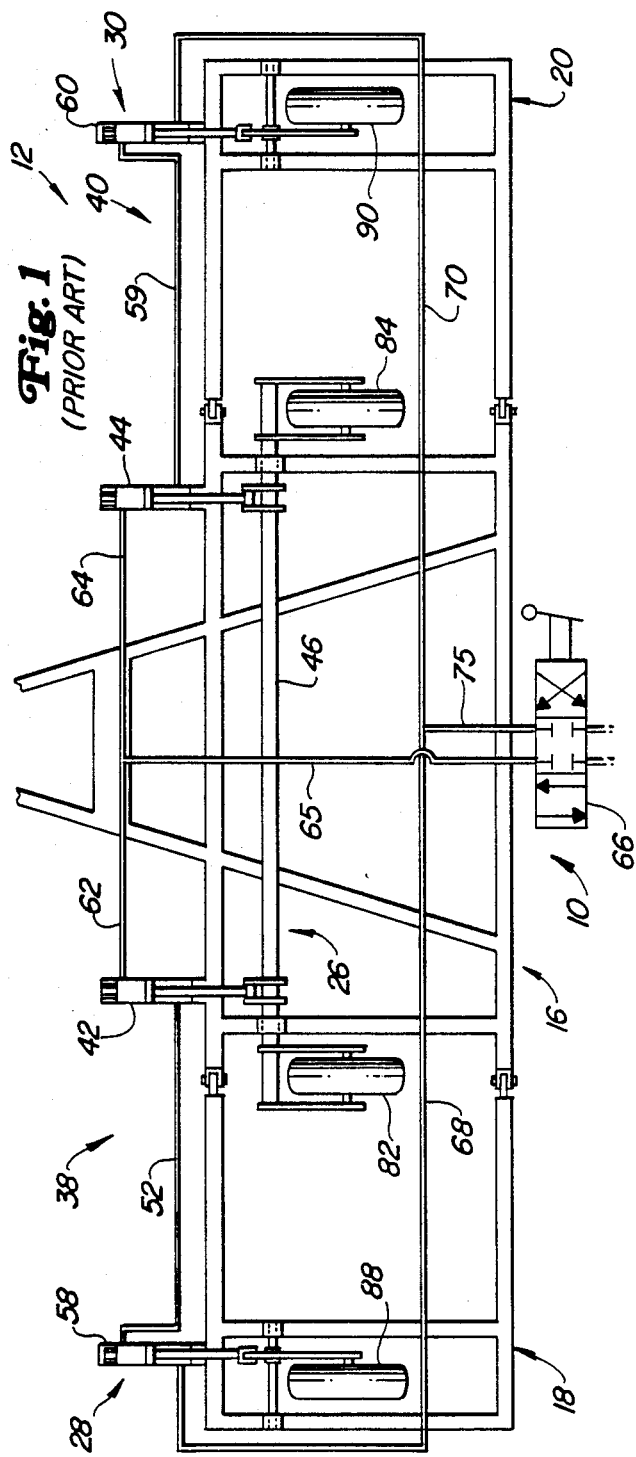
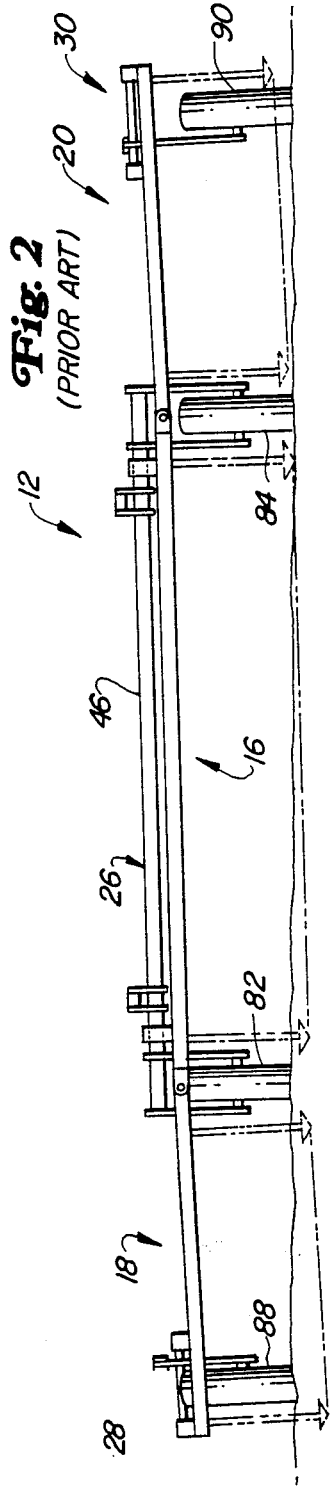

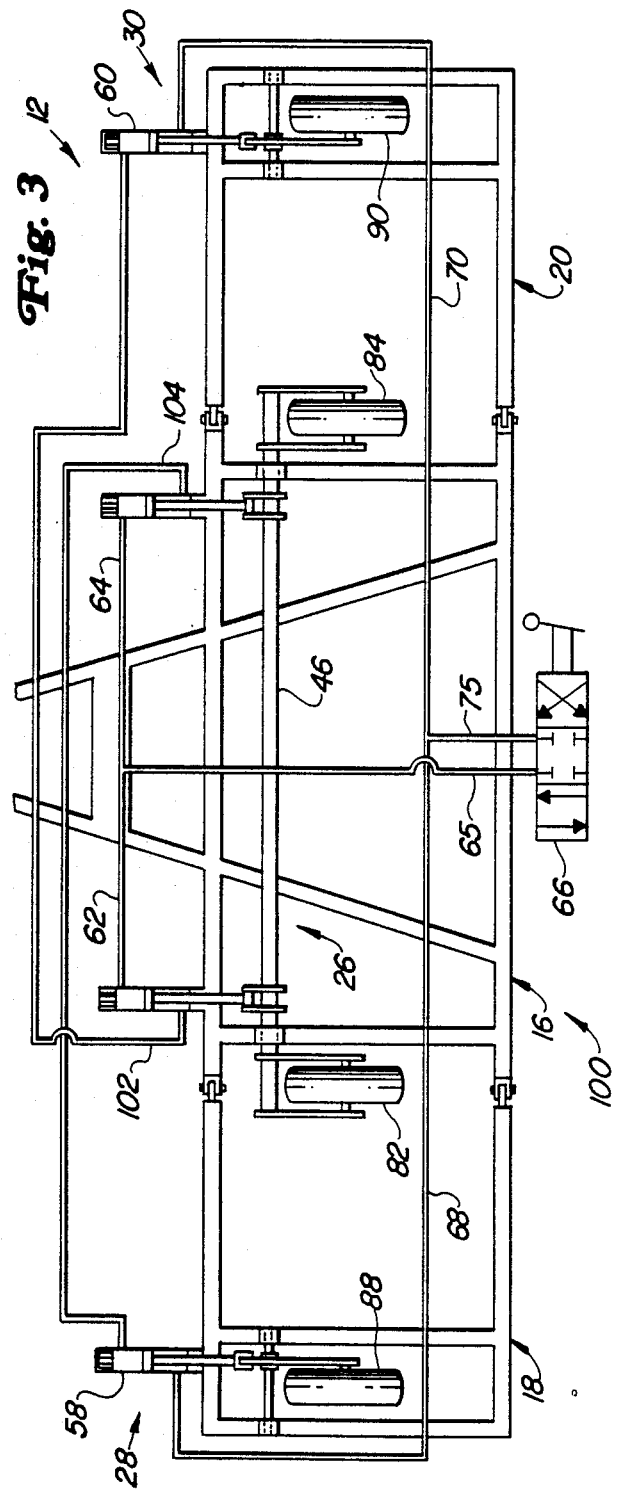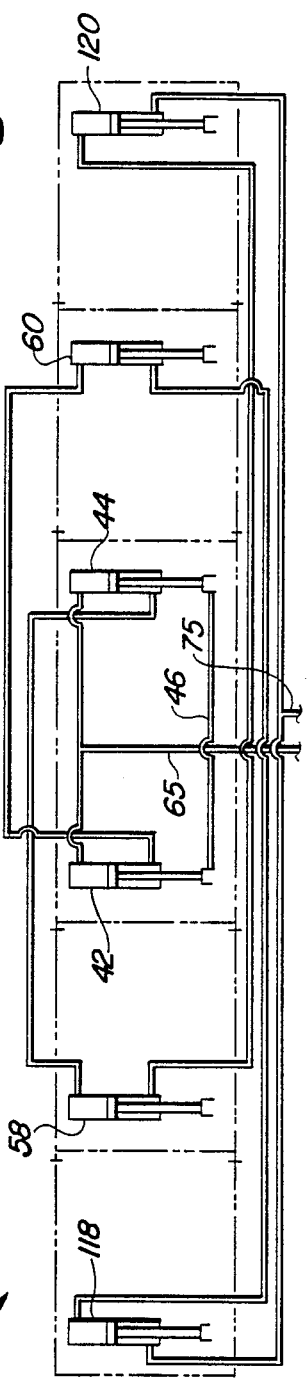

AGRICULTURAL DEPTH CONTROL SYSTEM INCLUDING CROSS PLUMBED SERIES CYLINDERS

BACKGROUND OF THE INVENTION (1) Field of the Invention:

The present relates generally to lift systems for agricultural implements, and more specifically, to a hydraulic lift system raising and lowering multi-section implements between raised transport and lowered depthcontrolled working positions.

(2) Related Art:

Large tillage implements often have a lift and depth control circuit such as depicted in FIG. 1 of in U.S. Pat. No. 3,663,032, of common ownership with the present application. Two lift cylinders connected to the lift wheel assemblies on the main frame of the implement are plumbed in parallel with each other and are connected through a mechanical member such as a rockshaft. The rockshaft keeps the opposite sides of the implement raising and lowering in unison and keeps a substantially uniform depth across the implement. Outrigger or wing frames pivotally connected to the opposite ends of the main frames each include a lift assembly with a cylinder connected in series with the nearest rockshaft cylinder to maintain a fairly uniform height across the width of the implement. However, uneven vertical forces across the width of the implement often cause rockshaft torsional wind-up which results in uneven depth, damage to the rockshaft, and side forces making steering of the towing vehicle more difficult. The problem of uneven forces is compounded since the wind-up of the rockshaft and the resulting change in displacement of the rockshaft cylinders causes the corresponding wing cylinders to move in the same direction. If the wing on one side starts digging in too deeply, the rockshaft cylinder which is connected in series with the wing cylinder will cause the corresponding side of the main frame to dig in more deeply also while the opposite side of the main frame will actually decrease in depth. Therefore the system is unstable in that initial reaction of uneven load tends to cause the loading to become more uneven. Although circuits have been proposed which hydraulically isolate the left-hand and the right-hand circuits when operating in the field, these circuits have added cost and complexity to the hydraulic system.

BRIEF SUMMARY OF THE INVENTION

It is therefore an object of the present invention to provide an improved depth control system for an implement. It is a further object to provide such a system which overcomes the aforementioned problems.

It is a further object of the invention to provide an improved depth control system for a wide agricultural tillage implement which provides improved depth control across the width of the implement and which reduces rockshaft wind-up and excessive side forces.

It is yet another object of the present invention to provide an improved depth control system for an implement which is relatively simple and inexpensive and yet provides more averaging on the implement from side to side than is obtainable with most presently available systems. It is yet another object of the present invention to provide an improved depth control system for a wide agricultural implement having a rockshaft with two lift cylinders plumbed in parallel connected to the rockshaft. It is still another object to provide such a system which significantly reduces torque wind-up of the rockshaft.

It is still another object of the present invention to provide an improved agricultural depth control system for a multi-section implement having two series cylinder circuits which operate substantially in parallel with each other. It is yet another object to provide such a system which balances vertical loading on the implement across its width.

In accordance with the above objects, a hydraulic control system is provided which includes a pair of transversely spaced rockshaft cylinders connected to opposite ends of a rockshaft on the central portion or main frame of a wide implement such as a field cultivator or chisel plow. The left-hand rockshaft cylinder is connected in series with the right-hand wing cylinder. The right-hand rockshaft cylinder is connected in series with the left-hand wing cylinder. When an uneven vertical loading condition exists which causes, for example, the left side of the implement to dig more deeply and the left-hand wing cylinder to retract, the right-hand rockshaft cylinder will also be caused to retract so the right side of the implement tends to dig in more deeply. At the same time, the left-hand rockshaft cylinder will be forced to extend (since the right-hand and left-hand rockshaft cylinders are connected in parallel) to reduce the depth of the left side of the implement. Therefore, the adjacent sections of the implement tend to offset the opposing motion of each other which results in the operating depth of the machine being automatically balanced from side to side. The system is substantially more stable than a conventional system in that the initial reaction to an uneven vertical load condition causes the cylinders to move in such a manner as to correct rather than compound that condition. Therefore, the problem of uneven loading causing rockshaft wind-up, increasing depth variations and side forces is overcome relatively simply and inexpensively, and existing depth control systems may be retrofitted with the present system quite easily. Additional valving, such as single-point depth control, can be included in the system while still accomplishing good depth control. The system may also be utilized with implements having more than three lift wheel assemblies, including five section flexible folding implements.

These and other objects, features and advantages of the present invention will become apparent to one skilled in the art upon reading the following detailed description in view of the drawings.

BRIEF DESCRIPTION OF THE DRAWINGS

FIG. 1 is a schematic representation of the hydraulic lift and depth control system for a prior art device.

FIG. 2 is a schematic representation of a multi-section implement illustrating in an exaggerated fashion the problem of rockshaft wind-up common with the system shown in FIG. 1.

FIG. 3 is a schematic representation of the lift and depth control system of the present invention on a three section implement.

FIG. 4 is a schematic representation of the lift and depth control system on a five section implement.

DETAILED DESCRIPTION OF THE DRAWINGS

Referring now to FIG. 1, therein is shown a conventional lift and depth control hydraulic circuit indicated generally at 10 and mounted on a multi-section implement 12. The implement 12 may be a three-section earth working implement, such as a chisel plow which includes a central or main frame section 16 and left-hand and right-hand wing frames or outriggers 18 and 20, respectively, pivotally connected for rocking about fore-and-aft extending axes to the outer ends of the central section 16. The central section 16 includes a main lift assembly indicated generally at 26. The left-hand and right-hand wings 18 and 20 include corresponding lift assemblies 28 and 30.

The hydraulic circuit 10 includes essentially two series cylinder circuits 38 and 40 operating in parallel with each other. The first circuit 38 includes a cylinder 42 connected to the section 16 and to the left-hand end of a transversely extending rockshaft 46 which is part of the lift assembly 26. The second series circuit 40 includes a cylinder 44 connected to the opposite end of the rockshaft 46. The rod end of the cylinder 42 is connected by a line 52 to the base end of a lift cylinder 58 operably connected to the left assembly 28. The rod end of the cylinder 44 is connected by a line 59 to the base end of a cylinder 60 connected to the right-hand wing lift assembly 30. The base ends of the cylinders 42 and 44 are connected together via lines 62 and 64 and to an output on a conventional operator control valve 66 located on the towing vehicle and connected to a source of hydraulic fluid (not shown). The rod end of the cylinders 58 and 60 are connected together via lines 68 and 70, respectively, and to the operator control valve 66 by a return line 75.

The rockshaft 46 is part of the lift assembly 26 and supports lift wheels 82 and 84 for rocking about the axis of the rockshaft 46 between raised field-working and lowered transport positions as the cylinders 42 and 44 are extended and retracted. The lift assemblies 28 and 30 include lift wheels 88 and 90 which, as a result of the series circuits 38 and 40, move in unison with the respective wheels 82 and 84. The rockshaft 46 generally constrains the wheels 82 and 84 for movement vertically in unison, but because of the distance between the wheels, the rockshaft will tend to torsionally wind up as uneven loading is experienced across the width of the implement. For example, if the left side of the implement is digging in and going deeper, the cylinder 42 will tend to retract and the cylinder 44 will extend (the volume of hydraulic fluid in the base ends of the cylinders 42 and 44 and in the lines 62, 64 and 65 remains constant) thereby causing the cylinder 58 to retract and the cylinder 60 to extend so that the left-hand side of the implement tends to dig in even more and the right-hand side of the implement tends to lift, thereby compounding the problems of uneven depth across the width of the implement and rockshaft wind-up. This action resulting in depth evenness is illustrated in an exaggerated manner in FIG. 2.

The hydraulic depth control system of the present invention is illustrated generally at 100 of FIG. 3. The lift assemblies 26, 28 and 30 remain substantially the same as shown for the conventional structure in FIGS. 1 and 2 However, the rod-end of the left-hand rockshaft cylinder 42 is connected by an extended length of line 102 to the base end of the right-hand wing cylinder 60 on the right-hand wing 20. The rod end of the right-hand rockshaft cylinder 44 is connected by an extended length of line 104 to the base end of the left-hand wing cylinder 58. The circuit 100 connects the right-hand wing cylinder 60 for operation in series with the left-hand rockshaft cylinder 42 and connects the left-hand wing cylinder 58 for operation in series with the right-hand rockshaft cylinder 44.

If, for example, the left-hand wing 18 increases in depth under changing soil conditions to retract the cylinder 58, oil is forced through the line 104 into the rod end of the righthand rockshaft cylinder 44 to retract the cylinder 44. Therefore, the right-hand side of the center section 16 also increases in depth as the series connected cylinders 44 and 58 retract in unison. At the same time, the left-hand rockshaft cylinder 42 will extend as oil flows from the base end of the cylinder 44 through the lines 64 and 62 into the base end of the cylinder 42. As the cylinder 42 extends, the left-hand side of the center section 16 is raised to reduce the digging in effect on the left side of the implement 12. Thus it can be appreciated that the system 100 provides a depthstabilizing effect.

When, for example, vertical loading exists tending to cause the left-hand side of the central section 16 to dig in more deeply (i.e., the cylinder 42 will be forced to retract while the cylinder 44 will be forced to extend), the righthand wing cylinder 60 will retract with the cylinder 42 to increase the depth of the right-hand side of the implement. At the same time, the left-hand wing cylinder 58 will extend with the extension of the right-hand rockshaft cylinder 44. The left-hand wing 18 will lift with extension of the cylinder 58 to reduce the digging in of the left-hand side and keep the average depth of the left-hand side of the implement substantially constant. The average operating depth of the implement is thus balanced from side-to-side.

The system as shown in 100 is substantially more stable than the system 10 shown in FIG. 1 wherein the initial reaction of uneven vertical loads tends to cause the loading to become more uneven. The present system as shown in FIG. 3 may be retro-fitted easily onto existing lift systems and provides a simple and inexpensive solution to the problems of uneven loading and rockshaft wind-up without requiring complex and expensive valving arrangements or the like. In addition, valving such as single-point depth control can be added to the system to automatically control the working height of the frame. The present system may also be utilized with large implements having more that three lift wheel assemblies such as with a five section chisel plow or field cultivator 112 (FIG. 4). In such an implement, a first series circuit may include the left rockshaft cylinder 42 in series with the right inner wing cylinder 60 which, in turn, is connected in series with an additional one of outermost wing cylinders 118 or 120. A second series circuit includes the right rockshaft cylinder 44, the left inner wing cylinder 58 and the remaining additional outermost wing cylinder 118 or 120. The two series circuits are then connected in parallel with each other through the rockshaft cylinders 42 and 44 which are constrained for operation generally in unison by the rockshaft 46 in the manner described above. In the embodiment shown in FIG. 4, the rod ends of the left and right cylinders 58 and 60 are connected in series with the base ends of the opposite outermost cylinders 120 and 118, respectively. In an alternate embodiment, the rod ends of the cylinders 58 and 60 are connected to the rod ends of the adjacent cylinders 118 and 120, respectively.

From the above description, it can be appreciated that the cross-connecting of the rockshaft cylinders with the opposite outer cylinders, although increasing hose length, provides a more uniform average working depth across the implement and balances the load on either side of the centerline of the implement without additional hydraulic valves or other controls. Having described the preferred embodiment, it will become apparent that various modifications can be made without departing from the scope of the invention as defined in the accompanying claims.

I claim:

1. In an agricultural implement having a transversely extending frame with a central portion and left and right outer end portions; a central lift assembly including left and right transversely spaced lift wheels; left and right rockshaft cylinders operably connected to the left and right lift wheels, respectively, for raising and lowering the central portion of the frame; a rockshaft extending between and operably connecting the lift wheels for operation generally in unison to keep a substantially constant frame height across the central portion of the frame, wherein the rockshaft cylinders are located adjacent the outer end portions, and whereby uneven vertical forces across the width of the frame cause some wind-up of the rockshaft; left and right outer lift wheel assemblies with corresponding outer cylinders connected to the left and right outer end portions, respectively, for raising and lowering the respective outer end portions; and means connecting the outer cylinders for operation with the left and right rockshaft cylinders to minimize rockshaft wind-up and depth variations across the width of the implement, the means connecting including a first conduit for connecting the left outer cylinder directly in series with the right rockshaft cylinder and a second conduit for connecting the right outer cylinder directly in series with the left rockshaft cylinder.

2. The invention as set forth in claim 1 wherein the first conduit includes a first end connected to the base end of one of the left outer and right rockshaft cylinders, and a second end connected to the rod end of the other of the left outer and right rockshaft cylinders.

3. The invention as set forth in claim 2 wherein the second conduit includes means for connecting the base end of one of the right outer and the left rockshaft cylinders with the rod end of the other of the right outer and left rockshaft cylinders.

4. The invention as set forth in claim 3 including conduit means connecting the rockshaft cylinders together for parallel operation.

5. The invention as set forth in claim 1 including conduit means connecting the rockshaft cylinders together for parallel operation.

6. In an agricultural implement having a transversely extending frame with a central portion and left and right outer frame portions; a central lift assembly including left and right transversely spaced lift wheels connected to the frame and offset toward the left and right ends, respectively, of the frame; left and right rockshaft cylinders operably connected to the left and right lift wheels, respectively, for raising and lowering the central portion of the frame; a rockshaft extending between and operably connecting the lift wheels for operation generally in unison to keep a substantially constant frame height across the central portion of the frame; means connecting the left and right rockshaft cylinders for operation in parallel, whereby uneven vertical forces across the width of the frame cause some wind-up of the rockshaft; left and right outer lift wheel assemblies connected to the left and right outer frame portions, respectively; left and right outer cylinders connected to the left and right lift wheel assemblies, respectively, for raising and lowering the respective outer frame portions; means connecting the outer cylinders for operation with the left and right rockshaft cylinders to minimize rockshaft wind-up and depth variations across the width of the implement, the means connecting including means for connecting the left outer cylinder in series with the right rockshaft cylinder and means for connecting the right outer cylinder in series with the left rockshaft cylinder; and wherein the means for connecting the left outer cylinder in series with the right rockshaft cylinder includes an elongated conduit extending between the rod end of the right rockshaft cylinder and the base end of the left outer cylinder, and the means for connecting the right outer cylinder in series with the left rockshaft cylinder includes an elongated conduit extending across the central portion of the frame from the rod end of the left rockshaft cylinder to the base end of the right outer cylinder.

7. In an agricultural implement having a transversely extending main frame and left and right outer wings pivotally connected to the outer ends of the main frame, central lift structure including left and right transversely spaced lift wheels, a rockshaft extending between and operably connecting the lift wheels for operation generally in unison to keep a substantially constant frame height across the central portion of the frame, left and right hydraulic rockshaft cylinders connected in parallel with each other and to the rockshaft for moving the lift wheels vertically for raising and lowering the central portion of the frame, whereby uneven vertical forces across the width of the frame cause some wind-up of the rockshaft; left and right outer lift wheel assemblies with corresponding outer cylinders connected to the left and right outer wings, respectively, for raising and lowering the respective outer wings; and means connecting the outer wing cylinders for operation with the left and right rockshaft cylinders to minimize rockshaft wind-up and depth variations across the width of the implement, the means connecting including means for connecting the left outer wing cylinder in series with the right rockshaft cylinder for operation in unison with the right rockshaft cylinder, and means for connecting the right outer wing cylinder in series with the left rockshaft cylinder for operation in unison with the left rockshaft cylinder; and wherein the rod ends of the rockshaft cylinders are connected to the cylinder ends of the wing cylinders.

8. The invention as set forth in claim 7 wherein the implement includes left and right additional wheel assemblies located outwardly of the left and right outer wheel assemblies, respectively, and corresponding additional eft and right lift cylinders, and means connecting the outer wing cylinders for operation in series with the additional left and right cylinders.

9. The invention as set forth in claim 8 wherein the additional left lift cylinder is connected in series with the right outer wing cylinder, and the additional right lift cylinder is connected in series with the left outer wing cylinder.

10. In an agricultural implement having a transversely extending main frame and left and right outer wings pivotally connected to the outer ends of the main frame, central lift structure including left and right transversely spaced lift wheels, a rockshaft extending between and operably connecting the lift wheels for operation generally in unison to keep a substantially constant frame height across the central portion of the frame, left and right hydraulic rockshaft cylinders connected in parallel with each other and to the rockshaft for moving the lift wheels vertically for raising and lowering the central portion of the frame, whereby uneven vertical forces across the width of the frame cause some wind-up of the rockshaft; left and right outer lift wheel assemblies with corresponding outer cylinders connected to the left and right outer wings, respectively, for raising and lowering the respective outer wings; and means connecting the outer wing cylinders for operation with the left and right rockshaft cylinders to minimize rockshaft wind-up and depth variations across the width of the implement, the means connecting including means for connecting the left outer wing cylinder in series with the right rockshaft cylinder for operation in unison with the right rockshaft cylinder and means for connecting the right outer wing cylinder in series with the left rockshaft cylinder for operation in unison with the left rockshaft cylinder, wherein the left outer wing cylinder and the right rockshaft cylinder comprise a first series-connected hydraulic circuit and the right outer wing cylinder and the left rockshaft cylinder comprise a second series-connected circuit.

11. The invention as set forth in claim 10 further including additional left and right outermost lift assemblies with corresponding left and right outermost lift cylinders, and including means for connecting the left and right outermost lift cylinders for series operation with the rockshaft cylinders.

* * * * *